United States Patent
Wamsser et al.

(10) Patent No.: US 7,069,478 B1
(45) Date of Patent: Jun. 27, 2006

(54) SAFETY DEVICE FOR A STORED-PROGRAM CONTROL

(75) Inventors: Reiner Wamsser, Michelstadt (DE);
Hans-Peter Lerch, Erbach (DE);
Jürgen Haeufgloeckner, Miltenberg (DE); Joachim Zeller, Michelstadt (DE); Gerhard Wolff, Michelstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/364,317

(22) Filed: Jul. 30, 1999

(30) Foreign Application Priority Data

Jul. 30, 1998 (DE) ................................. 198 34 331

(51) Int. Cl.
*G06F 11/00* (2006.01)

(52) U.S. Cl. ............................ 714/44; 714/40; 714/51; 714/55

(58) Field of Classification Search ................. 714/44, 714/40, 55, 51
See application file for complete search history.

(56) References Cited

U.S. PATENT DOCUMENTS

| | | | |
|---|---|---|---|
| 4,291,388 A | | 9/1981 | Ecker, Jr. et al. |
| 4,618,953 A | * | 10/1986 | Daniels et al. ............... 714/23 |
| 5,062,147 A | * | 10/1991 | Pickett et al. ................ 714/46 |
| 5,247,163 A | * | 9/1993 | Ohno et al. ................ 235/492 |
| 5,392,424 A | | 2/1995 | Cook |
| 5,404,356 A | * | 4/1995 | Abe ............................ 714/55 |
| 5,802,271 A | * | 9/1998 | Hashimoto et al. .......... 714/44 |
| 6,012,154 A | * | 1/2000 | Poisner ........................ 714/51 |
| 6,065,139 A | * | 5/2000 | Mehta et al. .................. 714/2 |
| 6,112,320 A | * | 8/2000 | Dien ............................ 714/51 |
| 6,173,339 B1 | * | 1/2001 | Yorimitsu ...................... 710/5 |
| 6,279,125 B1 | * | 8/2001 | Klein .......................... 714/38 |

FOREIGN PATENT DOCUMENTS

| | | |
|---|---|---|
| DE | 94 03 121.5 | 2/1995 |
| DE | 44 06 094 | 8/1995 |
| DE | 196 25 195 | 1/1998 |
| DE | 44 04 131 | 7/1998 |

OTHER PUBLICATIONS

Kadnier, Griffith Wm. Kadnier, Windows NT 4: The Complete Reference, 1997, Osborne/McGraw-Hill, Chapter 23.*
L. Luetkens, "Dos Fur Echtzeitaufgaben MIT Geringem Aufwand Fur C-Programmierer Realisierbar", de Franzis Verlag GmbH, Munchen, Bd. 42, Nr. 23, pp. 125-129.
J,. Wollert et al., "Automatisieren Mit Dem PC? Was Der Personal Computer Kann Und Wo Er Passen Muss", Elektronik, de, Franzis Verlag GmbH, Munchen, Bd.g 43, Nr. 6, pp. 76-82.
H. Gall et al., "Einsatz und Wirksamkeit von Programmlaufuberwachungen", Automatisierungstechnische Praxis 40(1998), pp. 40-48.—English abstract.
D. Kuschke, "Softwareschnittstelle SPS-INTERBUS-S", pp. 26-30.
Steuern and Regeln "Personal Computer in der Steuerungstechnik, Aufbau, Merkmale and Anwendungsgebiete von IPC", pp. 130-132.
Automatisieren "Software-SPS im Einsatz: Genug geredethandeln", pp. 40-44.

* cited by examiner

*Primary Examiner*—Robert Beausoleil
*Assistant Examiner*—Michael Maskulinski
(74) *Attorney, Agent, or Firm*—Kenyon & Kenyon LLP

(57) ABSTRACT

A safety device for a stored-program control includes a controller which exchanges data with a stored-program control and, via a bus controller and a bus system, with the peripheral to be controlled. A memory is provided, in which safety-relevant data of the stored-program control is stored, which is accessible to the controller.

11 Claims, 2 Drawing Sheets

SAFETY DEVICE FOR A STORED-PROGRAM CONTROL

BACKGROUND INFORMATION

German Patent No. 44 06 094 describes a method and a device for real-time operation of a processor. In order to operate a processor in real time under a non-real time-capable operating system, the existing external hardware interrupt sources have direct access to the non-maskable processor interrupt, bypassing the existing interrupt hardware and software.

Strict safety requirements of a stored-program control, however, call for additional measures in order to guarantee both the safety standard and the user-friendliness of a stored-program control, which can be run on a conventional personal computer.

SUMMARY OF THE INVENTION

The safety device according to the present invention for a stored-program control has a controller which exchanges data with a stored-program control and, via a bus controller and a bus system, with the peripheral to be controlled. A memory is provided, in which safety-relevant data of the stored-program control is stored, which the controller can access. In this preferably non-volatile memory, the data required for starting the stored-program control, such as remanent flags and important data modules, are stored. This additional storage allows the stored-program control to be quickly started in the event of a malfunction of the personal computer assuming the functions of a stored-program control. A conventional personal computer can be easily retrofitted with the hardware configuration according to the present invention in the form of an appropriate plug-in card.

Another embodiment provides a monitor in addition to the controller, which exchanges data with a stored-program control and, via a bus system, with the peripheral to be controlled. It monitors a ready status signal generated by the stored-program control and transmitted to it by the controller. A contactor providing an output signal which displays the operability of the stored-program control is activated as a function of the monitor. For example, if the ready status signal is not detected during a predefined period in a manner that is recognized as valid, the contactor modifies its output signal, so that the user is informed that the stored-program control is in an irregular state. With the help of the contactor output signal, the user can activate appropriate countermeasures or warning functions. The output signal is implemented via a zero potential contact.

According to one advantageous embodiment, the monitor activates a bus controller controlling the bus system as a function of the ready status signal. If the ready status signal of the stored-program control allows the stored-program control to conclude that a malfunction has occurred in the stored-program control, the monitor activates the bus controller so that the latter sends an activation signal corresponding to a safety state to the peripheral.

Another embodiment provides an additional interface in addition to the controller which exchanges data with a stored-program control and, via a bus system, with the peripheral to be controlled. This interface receives at least one control signal, which is forwarded to the stored-program control via the controller. The user can access the stored-program control, for example, via stop, on, or start commands, even if a non-real time-capable operating system, which normally ensures data exchange between user and stored-program control, is out of service.

In another embodiment, a real time controller is provided in addition to the controller which exchanges data with a stored-program control and, via a bus system, with the peripheral to be controlled. The real time controller sends a control signal to a bus system of a personal computer, and the bus system of the personal computer allows data exchange between the controller and the stored-program control. This real time controller may form an embodiment as described under the related art. The control signal ensures real time capability for a processor on which a non-real time capable and a real time capable operating system may be run. The two operating systems cannot operate simultaneously without this real time controller.

The components described for the different embodiments can be integrated to form a single functional unit in any combination according to the user's desires.

According to one advantageous embodiment, the controller, the memory and the monitor are arranged on a single circuit board. This ensures a highly reliable embodiment.

According to another advantageous embodiment, the controller, the monitor, the contactor and the interface are integrated to form a functional unit on a circuit board. In addition to the safety-relevant function blocks, the interface and the contactor allow the user to access the monitor function and to issue direct commands to the stored-program control.

DETAILED DESCRIPTION

Figure 1:
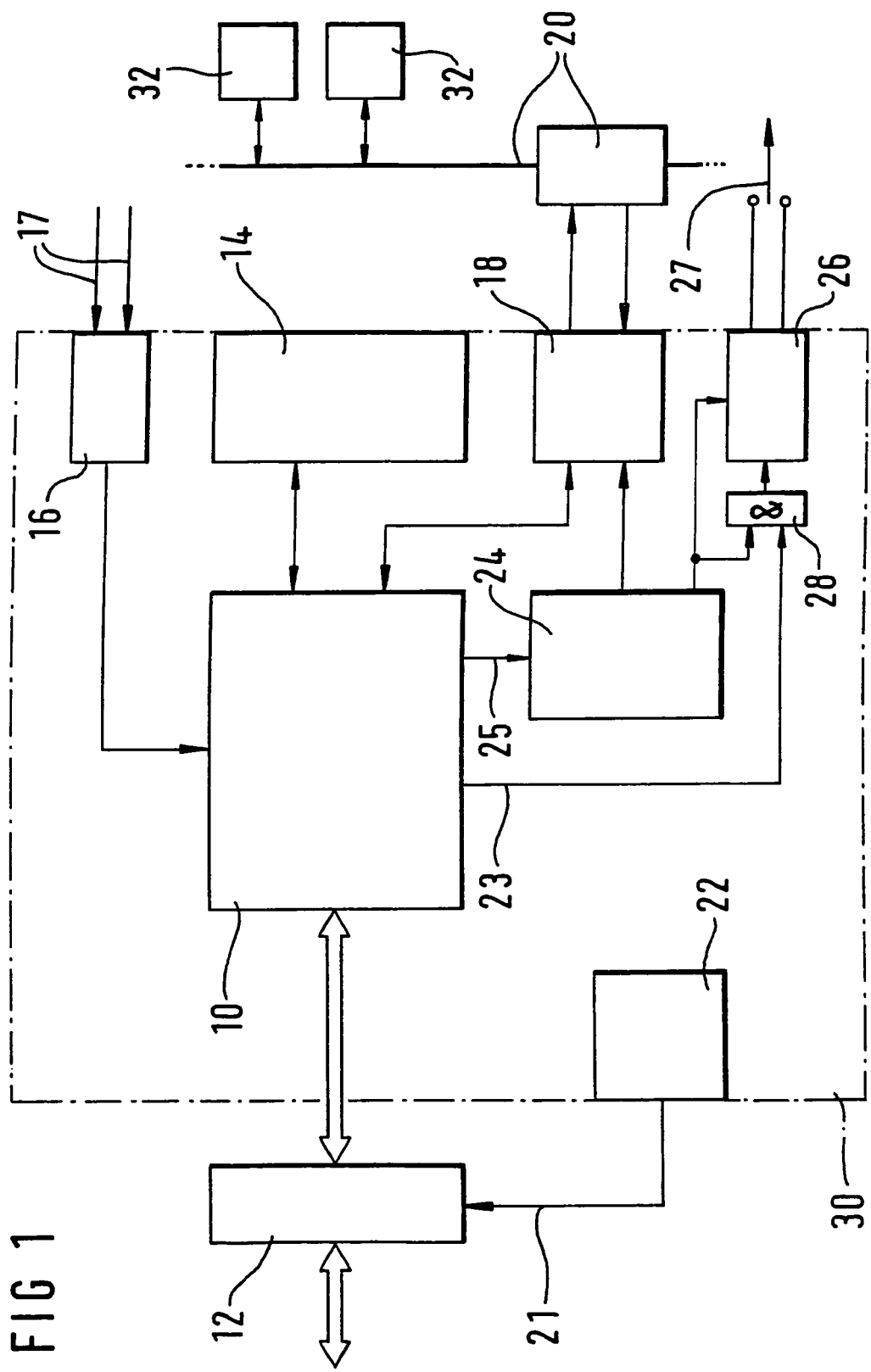
FIG. 1 shows a first block diagram of the device according to the present invention.

According to FIG. 1, a controller 10 exchanges data with a stored-program control (not illustrated) via a computer bus system 12. Controller 10 ensures data exchange with a memory 14. Controller 10 exchanges data with a bus controller 18, which accesses a bus system 20, to which peripheral 32 to be controlled is connected. Interface 16 receives control signals 17, which are relayed to controller 10. Controller 10 forwards a wake-up signal 25 of the stored-program control to a monitor 24. As a function of the wake-up signal 25, monitor 24 activates bus controller 18. Another signal generated by monitor 24 is sent to both contactor 26 and an AND gate 28. Controller 10 provides AND gate 28 with a ready status signal 23 coming from the stored-program control as another input signal. The output signal of AND gate 28 is sent to contactor 26, which generate an output signal 27, which can be picked up at two terminals. Controller 10, memory 14, interface 16, bus controller 18, real time controller 22, monitor 24, contactor 26 and AND gate 28 are arranged on a plug-in card 30.

FIG. 2 again shows the above-described components plug-in card 30, control signal 17, output signal 27, bus system 20 and peripheral 32 connected to the bus system. Plug-in card 30 is now inserted in the slot of a conventional computer 50 and connected to a display window 45 via the computer system 12 running under an operating system 43, to an SPS (a programmable logic controller) program 49, which may run under a real time operating system 47, a processor 51 and a main memory 53. A programming environment 41, not necessarily integrated in computer 50, also runs under operating system 43.

Figure 2:
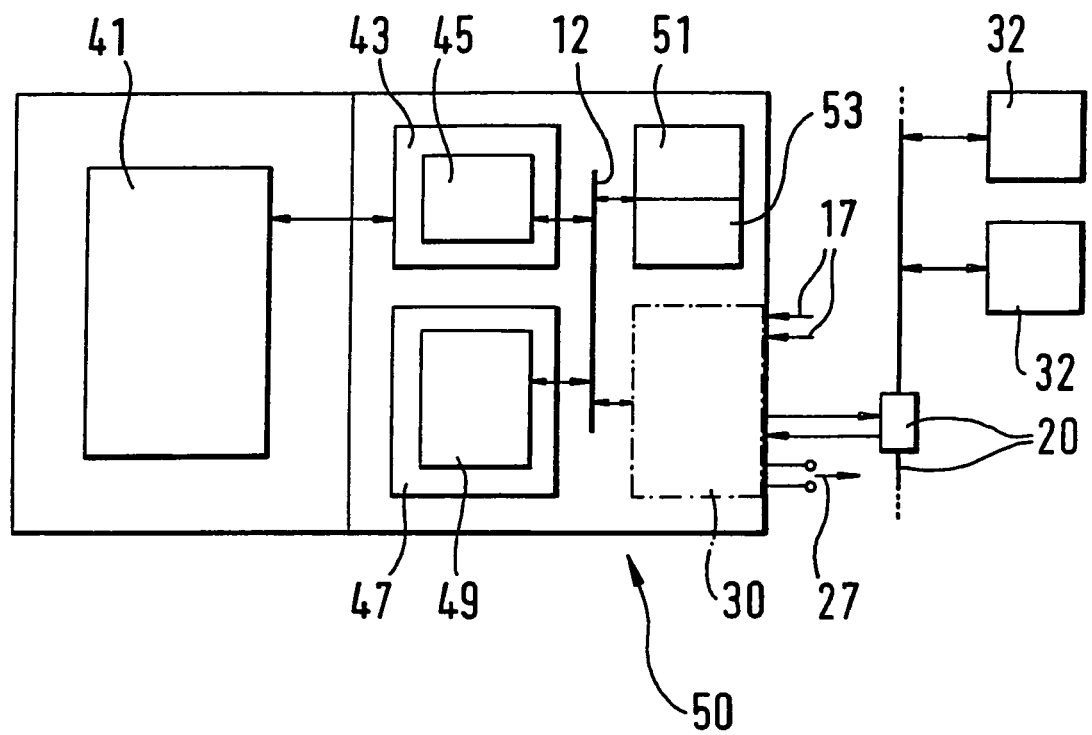
FIG. 2 shows a second block diagram of the device according to the present invention.

The basic design of the safety device for a stored-program control is now described with reference to FIG. 2. The stored-program control is formed by SPS program 49, which is run under real time operating system 47 in conjunction with processor 51. This SPS program 49 can be written by the user via programming environment 41. Programming environment 41 runs under operating system 43. This may be a non-real time capable operating system 43 of a conventional personal computer, such as Windows, for example. The user program written under programming environment 41 is compiled, so that it becomes SPS program 49, executable under real time operating system 47. This SPS program 49 processes the output signals of peripheral 32 using data modules. The respective control signals for peripheral 32 are generated depending on the input quantities for SPS program 49. Data is exchanged between the stored-program control, formed by SPS program 49 and real time operating system 47, and the peripheral 32 via computer bus system 12, plug-in card 30 and bus system 20, to which peripheral 32 is connected. A display window 45 is provided to display relevant states and data of peripheral 32. States of the inputs/outputs of peripheral 32 or of bus system 20 are displayed under operating system 43. Furthermore, the system may allow the user to configure the data to be displayed in display window 45 himself using programming environment 41.

With the initialization of computer 50, operating system 43 and the respective display window 45 are started. Then real time operating system 47 is initialized, whereupon SPS program 49 is loaded from main memory 53 and bus system 20 is configured. SPS program 49 starts at the point that depends on the status stored upon termination of the latest run. Program 49 is executed in real time and run cyclically until a terminate command appears. In this event, SPS program 49, the current data stored in the data modules and, as the case may be, the states in memory 14 are saved.

Additional safety-relevant functions, a display, and a user intervention option are implemented on plug-in card 30, which are elucidated below on the basis of FIG. 1. Controller 10 controls the data exchange between computer bus system 12 and bus system 20. The output states of peripheral 32 are cyclically read and forwarded to SPS program 49. SPS program 49 in turn delivers control signals for the inputs of peripheral 32. This data exchange is controlled by controller 10. In addition, controller 10 is responsible for the coupling with memory 14, which is preferably designed as a non-volatile, battery-buffered, remanent memory 14. Safety-relevant data, accessible to the SPS program, are stored in memory 14. These are preferably data that must be available even in the event of a power failure or a malfunction of computer 50 for quick restart, such as, for example, remanent flags or data modules in which characteristic peripheral data is permanently stored. Should computer 50 malfunction, the stored-program control can retrieve the data stored in memory 14 for the subsequent restart.

Control signals 17 are sent to controller 10 via interface 16. Control signals 17 can be influenced via switches. One input of interface 16, for example, can be used to set the stored-program control to stop mode. If the user activates the stop command via this control signal 17, controller 10 relays this signal to SPS program 49 via computer bus system 12, whereupon the SPS program jumps to the respective stop routine. The process is similar in the event of a second control signal 17, which is used as a start command to activate SPS program 49. This allows the user to influence the status of the stored-program control, bypassing programming environment 41.

Controller 10 relays wake-up signal 25 coming from the stored-program control to monitor 24. This is a cyclically occurring signal, a sync signal or a watchdog signal. Monitor 24 opens a time window of 2 seconds, for example, within which an edge of wake-up signal 25 must occur so that a conclusion can be made about the error-free operation of the stored-program control. Otherwise, monitor 24 generates an emergency signal for bus controller 18, which activates an emergency function of bus controller 18. If bus controller 18 receives this emergency signal from monitor 24, it sets peripheral 32 to a predefined safe mode. This safe mode command is stored in bus controller 18.

Contactor 26 provides an output signal 27, which can be picked up by the user, preferably in the form of a zero-potential switching signal. Output signal 27 indicates whether the stored-program control is in an error-free state. The display of an error state of the stored-program control can be initiated via a signal directly generated by monitor 24.

Controller 10 issues a software-generated error mode signal to monitor 24, which converts this signal via hardware into a control signal for contactor 26. As another alternative for generating an output signal 27 indicating the error state of the stored-program control is to supply the output signal of AND gate 28. To do so, a ready status signal 23 and the output signal of monitor 24 are AND-ed. The error state is then displayed by output signal 27 if the stored-program control issues no ready state signal 23 and also monitor 24 has recognized an error state. The appropriate display and warning functions can be activated via output signal 27.

Real time control 22 is also arranged on plug-in card 30, as described, for example, in German Patent No. 44 06 094. It issues a safety signal 21 to computer bus system 12, which ensures simultaneous operation of operating system 43 and real time operating system 47 without impairment of the real time capabilities of real time operating system 47.

Controller 10, memory 14, interface 16, bus controller 18, real time controller 22, monitor 24, contactor 26, and AND gate 28 are preferably arranged on a circuit board and thus form plug-in card 30.

The function of controller 10 and bus controller 18 can also be carried out by a single processor/module.

What is claimed is:

1. A safety device for a stored-program control coupling a computer bus system with a peripheral bus system, a peripheral being connected to the peripheral bus system, comprising:
    a controller for exchanging data with the stored-program control, the stored-program control continually executing an SPS program on a real-time operating system, the stored-program control exchanging data, via the peripheral bus system, with a peripheral to be controlled; and
    a memory for storing safety-relevant data of the stored-program control, the safety-relevant data being accessible by the controller.

2. The device according to claim 1, further comprising a monitor for monitoring a wake-up signal generated by the stored-program control and transmitted to the monitor by the controller.

3. The device according to claim 2, wherein the monitor activates a data exchange with a bus controller that controls the peripheral bus system as a function of the wake-up signal.

4. The device according to claim 1, further comprising a contactor for providing an output signal displaying an operability of the stored-program control.

5. The device according to claim 1, further comprising an interface for receiving at least one control signal forwarded to the stored-program control via the controller.

6. The device according to claim 1, further comprising a real-time controller for sending a control signal to the computer bus system, the computer bus system allowing a data exchange to take place between the controller and the stored-program control.

7. The device according to claim 1, further comprising a circuit board for accommodating at least one of the controller and the memory.

8. A safety device for a stored-program control coupling a computer bus system with a peripheral bus system, a peripheral being connected to the peripheral bus system, comprising:

a central controller for exchanging data with the stored-program control, the stored-program control continually executing an SPS program on a real-time operating system, the stored-program control exchanging data, via the peripheral bus system, with a peripheral to be controlled; and a monitor for monitoring a wake-Up signal generated by the stored-program control and transmitted to the monitor by the central controller, wherein the monitor activates, as a function of the wake-up signal, a bus controller, which controls a data transport via the peripheral bus system.

9. The device according to claim 8, further comprising a contactor for producing an output signal indicating an operability of the stored-program control.

10. The device according to claim 8, further comprising an interface for receiving at least one control signal forwarded to the stored-program control via the central controller.

11. The device according to claim 8, further comprising a circuit board for accommodating at least one of the central controller and the monitor.

* * * * *